(12) United States Patent
Eckel

(10) Patent No.: US 10,850,906 B2
(45) Date of Patent: Dec. 1, 2020

(54) AIR CUSHION MACHINE AND METHOD

(71) Applicant: Storopack, Inc., Cincinnati, OH (US)

(72) Inventor: Thomas G. Eckel, Milford, OH (US)

(73) Assignee: Storopack, Inc., Cincinnati, OH (US)

( * ) Notice: Subject to any disclaimer, the term of this patent is extended or adjusted under 35 U.S.C. 154(b) by 430 days.

(21) Appl. No.: 14/637,776

(22) Filed: Mar. 4, 2015

(65) Prior Publication Data
US 2016/0257474 A1 Sep. 8, 2016

(51) Int. Cl.
*B65D 81/02* (2006.01)
*B31D 5/00* (2017.01)
*B29C 67/00* (2017.01)
*B29L 22/00* (2006.01)

(52) U.S. Cl.
CPC .......... *B65D 81/02* (2013.01); *B29C 67/0014* (2013.01); *B31D 5/0073* (2013.01); *B29L 2022/007* (2013.01); *B31D 2205/007* (2013.01)

(58) Field of Classification Search
CPC .... B65D 81/052; B65D 81/02; B31D 5/0073; B31D 2205/0088; B29C 67/0014; B29L 2022/007
USPC .................................................. 53/403, 967
See application file for complete search history.

(56) References Cited

U.S. PATENT DOCUMENTS

| 3,667,593 | A | * | 6/1972 | Pendleton ............... B29C 65/18 206/522 |
| 5,829,231 | A | * | 11/1998 | Harding ............... B31D 5/0047 493/25 |
| 5,871,429 | A | * | 2/1999 | Harding ............... B31D 5/0047 493/25 |
| 5,876,318 | A | | 3/1999 | Ratzel |
| RE36,501 | E | * | 1/2000 | Hoover ................. B29C 66/439 156/147 |
| 6,116,000 | A | * | 9/2000 | Perkins ............... B31D 5/0073 53/139.5 |
| 6,170,227 | B1 | | 1/2001 | Kovacs et al. |
| 6,341,473 | B1 | | 1/2002 | Kovacs et al. |
| 6,598,373 | B2 | * | 7/2003 | Sperry ................. B31D 5/0073 53/403 |
| 6,758,026 | B2 | * | 7/2004 | Davey ....................... B65B 9/13 53/403 |

(Continued)

FOREIGN PATENT DOCUMENTS

CN 101801794 A 8/2010
EP 2407389 A1 1/2012

(Continued)

OTHER PUBLICATIONS

STOROpack B.V., AIRplus Excel Instruction Manual Version 1.0, Copyright 2002.

(Continued)

*Primary Examiner* — Dariush Seif
(74) *Attorney, Agent, or Firm* — Wood Herron & Evans LLP

(57) ABSTRACT

A method of producing air cushions with an air cushion machine for cushioning at least one item to be shipped in a box comprises the steps of determining a void volume defined by a difference between a volume of the box and a volume of the at least one item to be shipped in the box, and producing a quantity of air cushions with the air cushion machine having a total air cushion volume, the total air cushion volume being equal to the void volume.

13 Claims, 7 Drawing Sheets

(56) References Cited

U.S. PATENT DOCUMENTS

| | | | | |
|---|---|---|---|---|
| 7,571,589 B2* | 8/2009 | Shaw | B31D 5/0073 | 225/100 |
| 7,677,267 B2* | 3/2010 | Warnick | F15B 11/028 | 137/492.5 |
| 7,814,733 B2 | 10/2010 | Carlson et al. | | |
| 7,823,367 B2 | 11/2010 | Boigues et al. | | |
| 8,087,218 B2* | 1/2012 | Harding | B65B 55/20 | 493/967 |
| 8,356,463 B2* | 1/2013 | Salerno | B29C 44/182 | 53/403 |
| 8,668,418 B2* | 3/2014 | Root | B60P 7/065 | 410/119 |
| 2004/0154728 A1* | 8/2004 | Selle | B29C 65/7841 | 156/147 |
| 2006/0090421 A1* | 5/2006 | Sperry | B29C 65/02 | 53/403 |
| 2006/0218880 A1* | 10/2006 | Sperry | B29C 66/43129 | 53/403 |
| 2008/0066852 A1* | 3/2008 | Wetsch | B29C 65/18 | 156/147 |
| 2008/0092488 A1* | 4/2008 | Gabrielsen | B65B 55/20 | 53/428 |
| 2008/0141620 A1* | 6/2008 | Szabo | B29C 65/086 | 53/79 |
| 2009/0031676 A1* | 2/2009 | Boigues | B65B 7/20 | 53/491 |
| 2009/0049798 A1* | 2/2009 | Lorsch | B65B 55/20 | 53/79 |
| 2009/0173040 A1* | 7/2009 | Carlson | B65B 55/20 | 53/250 |
| 2009/0277139 A1* | 11/2009 | Eckel | B65B 55/20 | 53/474 |
| 2010/0031646 A1 | 2/2010 | Iwase et al. | | |
| 2010/0050571 A1* | 3/2010 | Birkle | B31D 5/0073 | 53/266.1 |
| 2011/0016833 A1* | 1/2011 | Carlson | B65B 55/20 | 53/473 |
| 2011/0038204 A1 | 2/2011 | Chou | | |
| 2011/0172072 A1* | 7/2011 | Wetsch | B31D 5/0073 | 493/227 |
| 2011/0197550 A1* | 8/2011 | Carlson | B31D 5/0047 | 53/472 |
| 2011/0247725 A1* | 10/2011 | Frayne | B31D 5/0073 | 141/10 |
| 2011/0308204 A1* | 12/2011 | Corradi | B65B 57/14 | 53/472 |
| 2013/0032293 A1* | 2/2013 | Birkle | B31D 5/0073 | 156/538 |
| 2014/0158305 A1* | 6/2014 | Knaak | B31D 5/0078 | 156/538 |
| 2014/0261752 A1* | 9/2014 | Wetsch | B65B 41/16 | 137/223 |
| 2015/0075114 A1* | 3/2015 | Murch | B29D 22/02 | 53/52 |
| 2015/0239195 A1* | 8/2015 | Wetsch | B31D 5/0073 | 53/403 |
| 2015/0379462 A1* | 12/2015 | Wetsch | B65B 3/04 | 705/28 |

FOREIGN PATENT DOCUMENTS

| | | |
|---|---|---|
| JP | 2005-518969 A | 6/2005 |
| JP | 2010208699 A | 9/2010 |
| WO | 03/074364 A1 | 9/2003 |

OTHER PUBLICATIONS

European Search Report in corresponding EP Application No. 35020718, dated Aug. 2, 2016.
English Translation of Search Report in corresponding CN Application No. 2016101242647, filed Mar. 4, 2016.
English Translation of Second Search Report in corresponding CN Application No. 2016101242647, filed Mar. 4, 2016.
English Translation of Third Search Report in corresponding CN Application No. 2016101242647, filed Mar. 4, 2016.
English Translation of Third Search Report in corresponding JP Application No. 2016-040790, filed Mar. 3, 2016.
English Translation of Final Office Action in corresponding CN Application No. 2016-040790, dated Aug. 31, 2020.

* cited by examiner

AIR CUSHION MACHINE AND METHOD

RELATED APPLICATIONS

N/A.

FIELD OF THE INVENTION

This invention relates generally to protective packaging, and more particularly to air cushions and machines for making air cushions.

BACKGROUND OF THE INVENTION

It is known to provide protective packaging material to surround an item in a box that is to be shipped in the box. The protective packaging material is placed between the walls of the box and the item shipped, and the box is then closed by taping the box flaps closed. Such protective packaging can be strips of crumpled paper in the form of paper cushions, air filled plastic bags in the form of air pillows or cushions, or foam "peanuts" (collectively "cushioning material"). Paper cushions and air cushions are typically made on site with a machine for that purpose, and then dispensed from the machine into the box. In the case of foam peanuts, those are typically pre-manufactured and shipped to the site, and then dispensed from a large hopper into the box.

It is also known to determine the difference between the volume of the box and the volume of the item or items to be shipped in the box ("void volume"), and then send a signal representative of the void volume to the paper cushion machine, air cushion machine, or foam peanut dispenser to dispense a given amount of cushioning material based on the signal received.

One technique for determining the void volume is to measure it with an instrument such as an optical sensor or a mechanical probe. Another technique for determining the void volume is to use warehouse management software ("WMS"). The WMS determines the volume of the item to be shipped from a database or look up table, selects a suitable size box which is of a larger volume than the item so as to accommodate the item and a suitable amount of cushioning material, and then subtracts the item volume from the box volume to determine the void volume.

Upon receipt of the signal representative of the void volume, the paper cushion machine then theoretically forms the appropriate number of paper cushions of a given length, and they are dispensed into the box. Or, the air cushion machine then theoretically forms the appropriate number of air cushions of a given volume, and they are dispensed into the box. Or still, the foam peanut dispenser then theoretically dispenses the appropriate quantity of foam peanuts into the box.

In practice, however, the volume of void fill cushioning material made and dispensed may not exactly match the void volume to be filled, resulting in under fill or over fill. In the case of paper cushions and foam peanuts, it is a rather simple task to add or subtract a short paper cushion or a small amount of foam peanuts, to exactly match the void volume in the box. However, in the case of air cushions, if the void volume divided by the air cushion volume does not produce a whole number, the operator must either subtract one air cushion, in which case the items will be allowed to move in the box during shipment, or add one air cushion, in which case the box flaps, when closed, will bow making the box flaps difficult to tape and creating difficulties in stacking boxes in the shipping container.

Accordingly, further improvement in air cushion machines and methods is desired.

SUMMARY OF THE INVENTION

In one aspect, a method of producing air cushions with an air cushion machine for cushioning at least one item to be shipped in a box is provided. The method comprises the steps of determining a void volume defined by a difference between a volume of the box and a volume of the at least one item to be shipped in the box, and producing a quantity of air cushions with the air cushion machine having a total air cushion volume, the total air cushion volume being equal to the void volume.

The void volume can be measured with an instrument, or it can be calculated based on a known volume of the at least one item and a known volume of the box. Each air cushion of the quantity of air cushions can have the same volume, or, all but one air cushion of the quantity of air cushions can have the same volume. The method can further comprise the steps of generating a signal representative of the void volume, supplying the signal to the air cushion machine, and commanding, with the signal, the air cushion machine to produce the quantity of air cushions having the total air cushion volume equal to the void volume.

In another aspect, a protective packaging system producing cushioning material for cushioning at least one item to be shipped in a box is provided. The system comprises means for determining a void volume defined by a difference between a volume of the box and a volume of the at least one item to be shipped in the box, and an air cushion machine controllable in response to the void volume to produce a quantity of air cushions having a total air cushion volume, the total air cushion volume being equal to the void volume.

The system can further comprise a controller for receiving a signal, representative of the void volume, from the means for determining a void volume, and for sending a signal to the air cushion machine commanding the air cushion machine to produce the quantity of air cushions having the total air cushion volume. The means for determining the void volume can be an instrument of measurement, or a database of box volumes and item volumes and a processor for subtracting item volumes from box volumes. The air cushion machine can include a supply of plastic film, a pulling assembly for pulling the film through the machine, an air injection assembly for injecting air between plies of the film, and a longitudinal seal assembly for sealing plies of the film. The controller sends signals to the pulling assembly, the air injection assembly, and the longitudinal seal assembly in commanding the air cushion machine to produce the quantity of air cushions having the total air cushion volume. The controller can vary the output pressure of the air injection assembly.

The air cushion machine can further include a separation assembly for separating a leading air cushion or string of air cushions from a trailing air cushion; the controller sends signals to the separation assembly to command the separation assembly to separate the leading air cushion or string of air cushions from the trailing air cushion.

The supply of plastic film can comprise an elongated continuous tubular sheet having a series of transverse heat seals formed in the plastic sheet and spaced apart along the longitudinal extent of the sheet, and a series of transverse lines of perforations spaced apart along the longitudinal extent of the sheet.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 1:
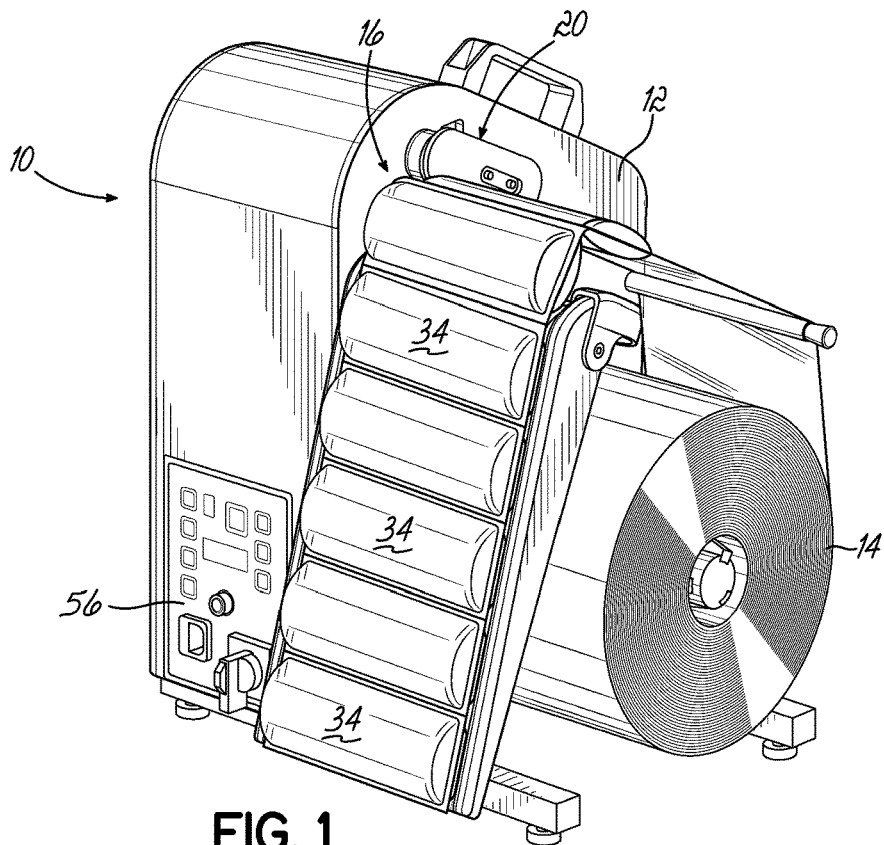
FIG. 1 is a perspective view of an air cushion machine which can be utilized in the practice of the present invention.
Figure 2:
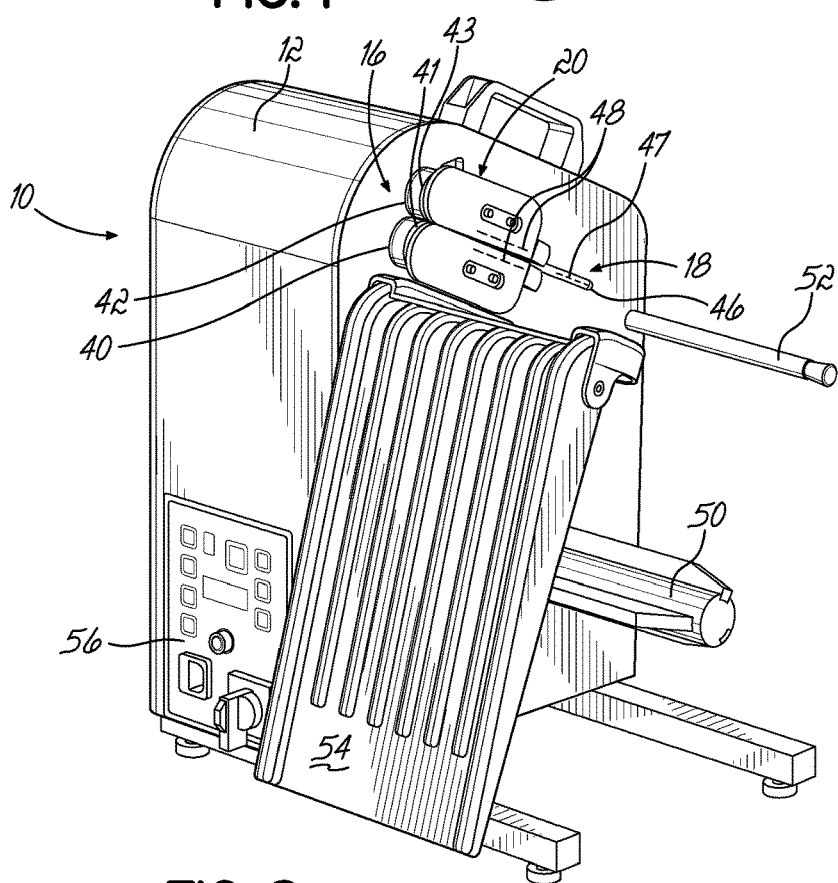
FIG. 2 is a view similar to FIG. 1 but without the roll of film and string of air cushions.

Referring first to FIGS. 1 and 2, one type of air cushion machine 10 for producing air filled cushions for use as protective packaging cushioning material is illustrated. The machine 10 illustrated in FIGS. 1 and 2 is the AIRplus® Excel machine commercially available from the assignee of the present invention.

The illustrated machine 10 comprises a machine frame 12, a supply of plastic film 14, a pulling assembly 16 for pulling the plastic film 14 through the machine 10, an air injection assembly 18 for injecting air between plies of the plastic film 14, and a longitudinal heat sealing assembly 20 for sealing the plies of plastic film together after air is injected between the plies of film.

Figure 6A:
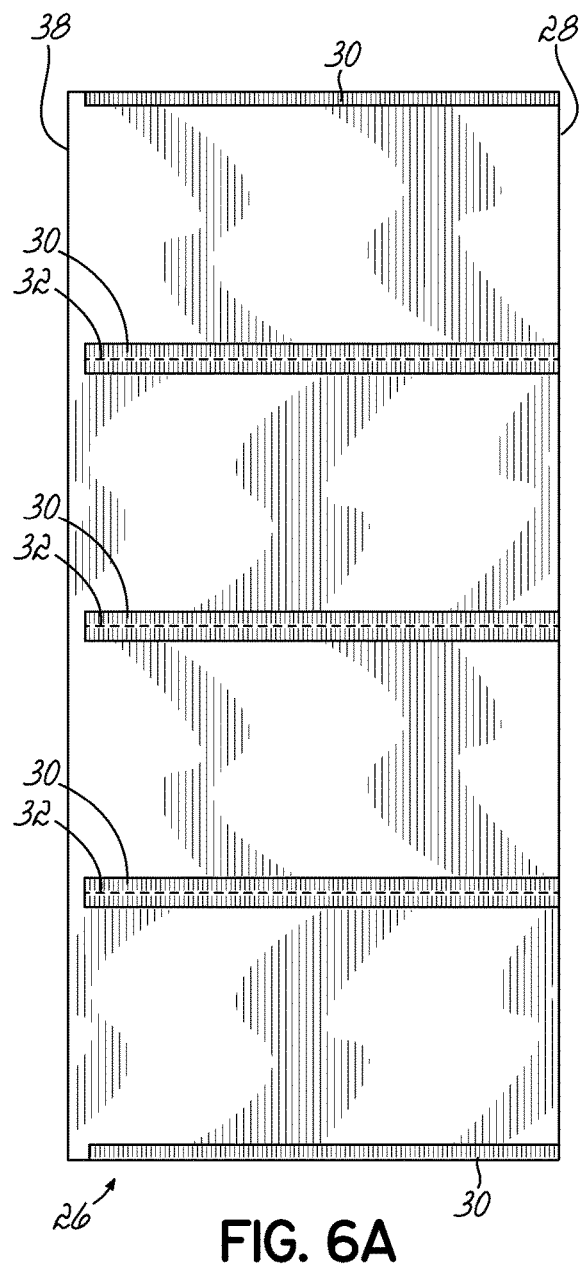
FIG. 6A is a top view of a folded sheet of plastic film for use in the machine of FIGS. 1 and 2.
Figure 6B:
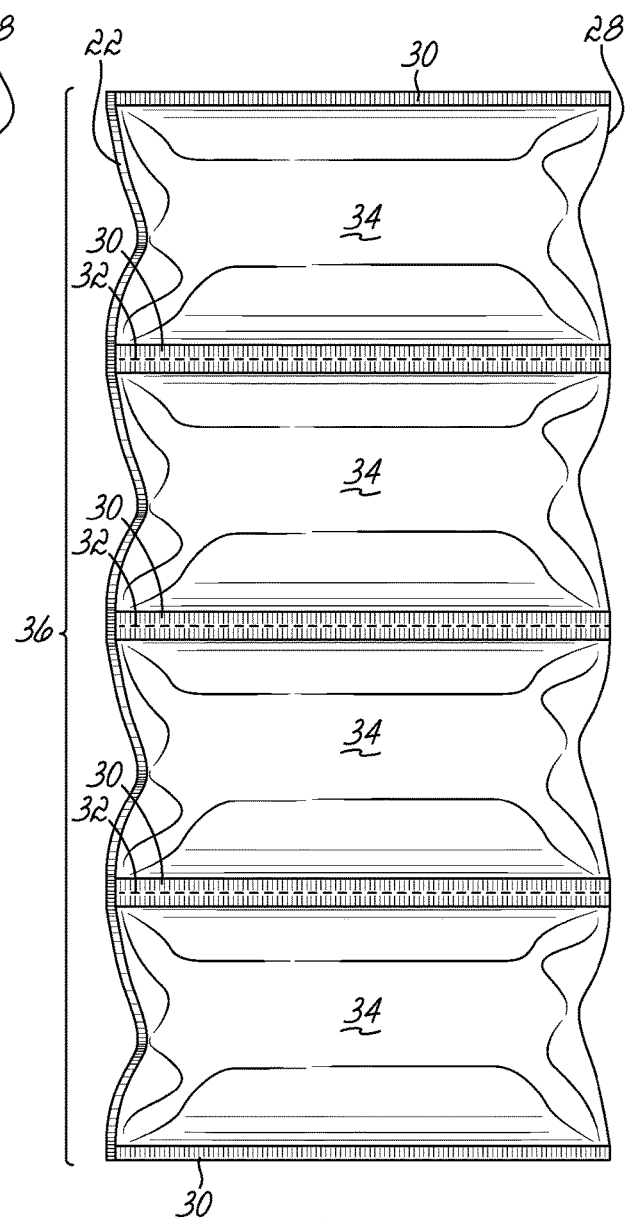
FIG. 6B is a top view of a string of air cushions which can be produced by the machine and system of FIGS. 1-4.

Referring to FIGS. 6A and 6B, the supply of plastic film 14 is a preformed polymer film provided to the machine 10 from a roll of continuous tubular sheet material 26 thus providing an elongated sheet of two plies of juxtaposed plastic film. A series of transverse heat seals 30 are formed in the plies of plastic film, are spaced apart along the longitudinal extent of the sheet 26, and extend from one longitudinal side edge 28 of the sheet 26 to just shy of the other longitudinal side edge 38 of the sheet 26. Within each transverse heat seal 30 a transverse score line or line of perforations 32 is formed for use in separating a leading air cushion 34 from an adjacent trailing air cushion 34, or separating a leading string 36 of air cushions 34 from an adjacent trailing air cushion 34. Note that while, as illustrated, a single continuous heat seal 30 forms the trailing end of the leading air cushion 34 and the leading end of a trailing air cushion 34, the sheet 26 could also be formed with essentially discrete spaced apart heat seal lines, with the leading heat seal line forming the trailing end of the leading air cushion 34 and the trailing heat seal line forming the leading end of the trailing air cushion 34. Accordingly, all such film variations are contemplated herein.

Referring back to FIGS. 1 and 2 and still to FIGS. 6A and 6B, the tubular sheet of polymer film 26 is unwound from the supply roll 14 and transported past a stationary blade 47 (in phantom). The blade 47 continuously slits the longitudinal side edge 38 of the sheet of film 26 creating an opening in the tubular film and into each pocket formed by an adjacent pair of transverse heat seals 30.

The inflation assembly 18 comprises an inflation tube 46 positioned downstream of the blade 47, and an ambient air blower or other source of air or other fluid (not shown), for inflating each pocket formed by the transverse heat seals 30 as the film is conveyed past the tube 46. The tube 46 is configured to be positioned between the two plies of the film sheet 26 after the sheet 26 has been slit by the blade 47; the two plies of the film sheet 26 are thus drawn over the tube 46 by the pulling assembly 16.

The pulling assembly 16 comprises an opposed pair of rotating Teflon® belts 40, 42, downstream of the inflation assembly 18. The belts 40, 42 grip the edge 38 of the sheet of film 26 and convey the film. Each of the belts 40, 42 is driven by a respective drive roller 41, 43.

The longitudinal heat sealing assembly 20 comprises an electric heated sealing wire or filament 48 (in phantom) underneath one or both of the belts 40, 42. The wire 48 continuously forms a seal 22 by melting, heat welding, or otherwise fusing the two film plies of the respective openings into the pockets formed by adjacent ones of the transverse heat seals 30, to trap the air such that the pockets remain inflated as interconnected cushions 34.

The roll of film 14 is supported on a spindle 50. The sheet of film 14 passes over a guide bar 52 and feeds into the pulling assembly 16. The formed air cushions 34 slide downwardly from the pulling assembly 16 and longitudinal heat sealing assembly 18 along a discharge slide 54. An operator interface panel 56 is provided for generally operating the machine 10 such as turning the machine 10 on and off, supplying the machine 10 with various inputs, and for receiving various outputs from the machine 10.

Figure 3:
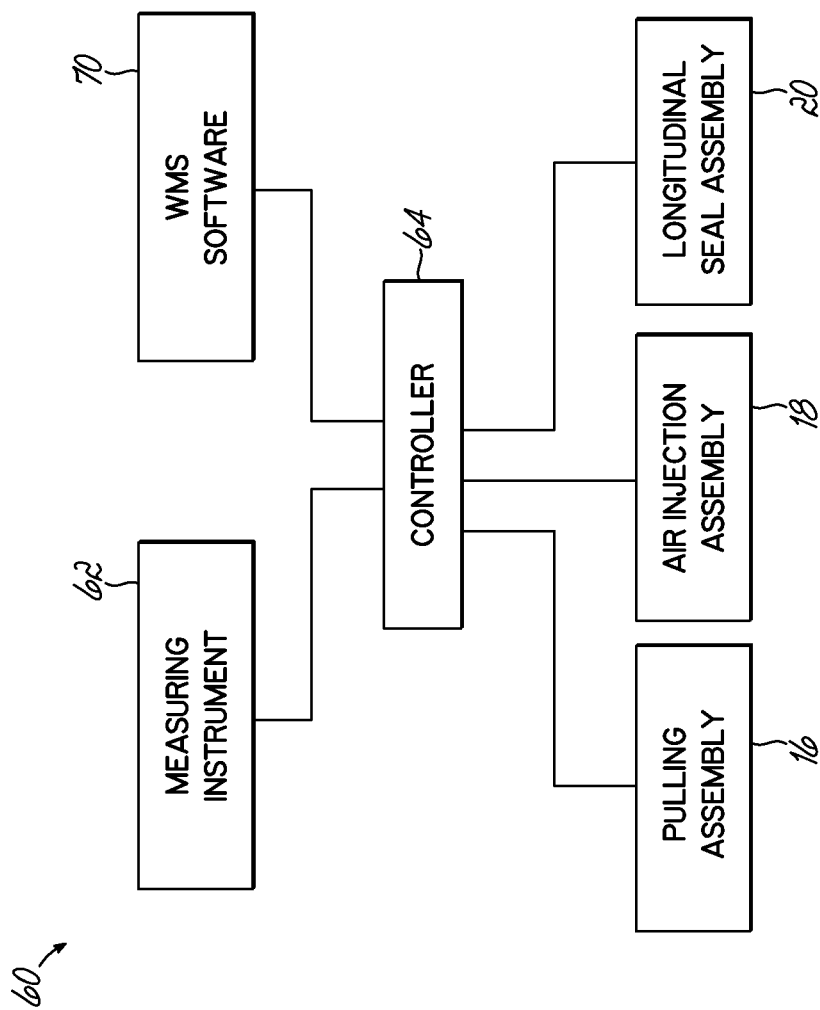
FIG. 3 is a block diagram of a system utilizing the air cushion machine of FIGS. 1 and 2.
Figure 9:
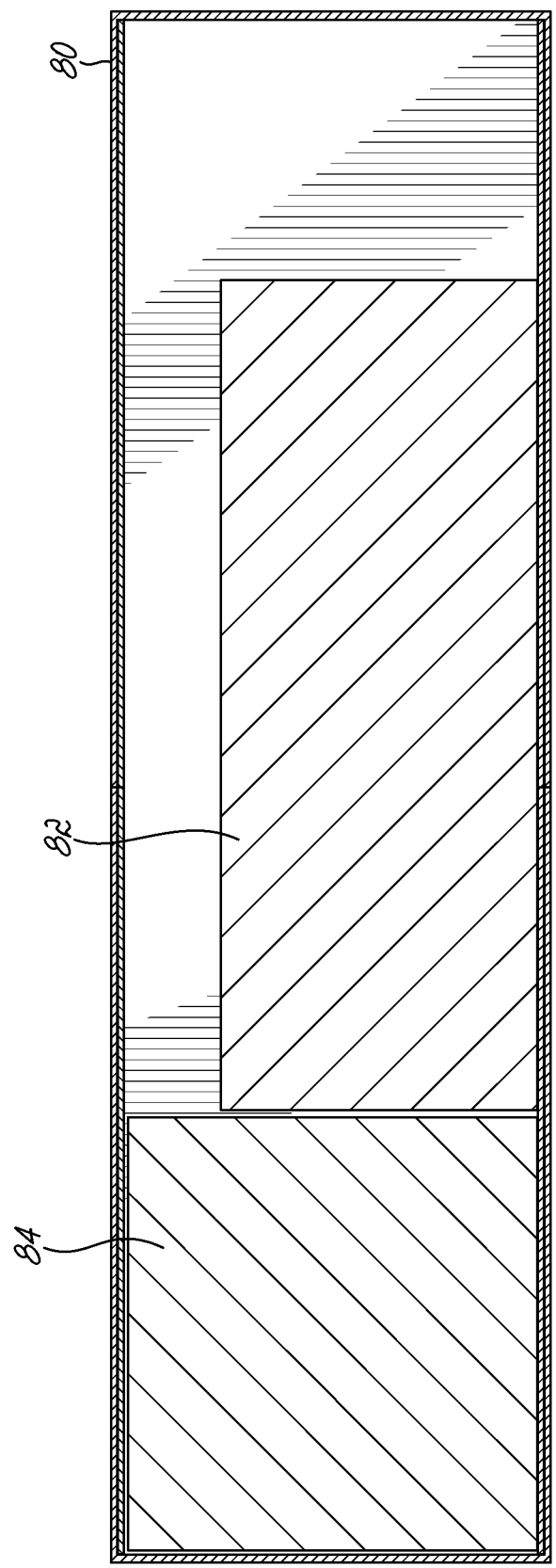
FIG. 9 is a side view of a shipping box containing items to be shipped in the box.

Referring now to FIGS. 3 and 9, a block diagram 60 of a system incorporating the machine 10 is illustrated. A measuring instrument 62, for example an optical sensor or a mechanical probe, etc., can be provided to measure the difference between the volume of the box 80 chosen to ship the item or items 82, 84 in and the volume of the item or items 82, 84 to be shipped in the box 80, i.e. the void volume. The measuring instrument 62 then sends a signal representative of the void volume to a controller 64 which sends various signals to the various assemblies of the air cushion machine 10, for example pulling assembly 16, air injection assembly 18, and longitudinal heat sealing assembly 20, for controlling those assemblies.

Alternatively, warehouse management software ("WMS") 70, running on a processor, can be used to calculate the void volume. The WMS 70 determines the volume of the item or items 82, 84 to be shipped from a database or look up table, selects a suitable size box 80 which is of a larger volume than the item or items 82, 84 so as to accommodate the item or items 82, 84 and a suitable amount of cushioning material, and then subtracts the volume of the item or items 82, 84 from the volume of the box 80 to determine the void volume. The WMS 70 then sends a signal representative of the void volume to the controller 64 which sends various signals to the various assemblies of the air cushion machine 10, for example pulling assembly 16, air injection assembly 18, and longitudinal heat sealing assembly 20, for controlling those assemblies. Operation of the WMS 70 is more particularly described in the assignee's U.S. Patent Publication No. 2009/0277139, hereby incorporated by reference herein as if fully set forth in its entirety.

Figure 4:
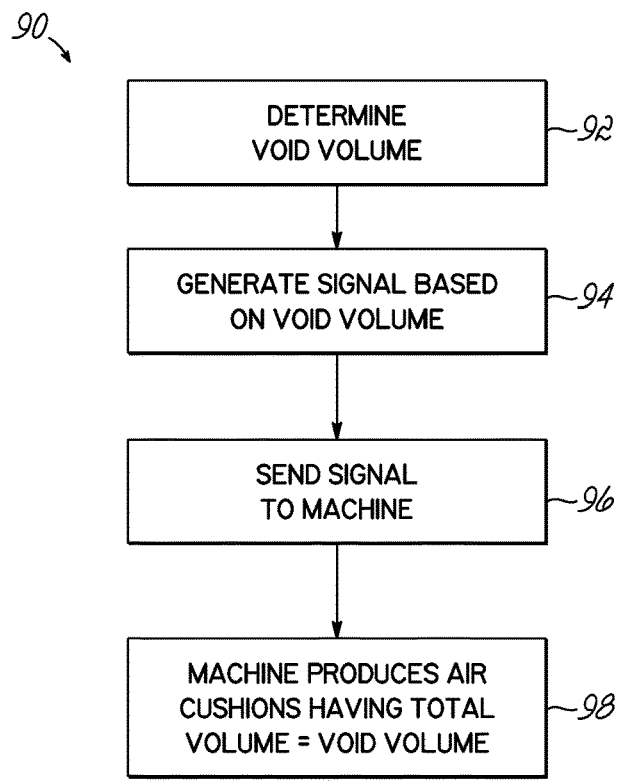
FIG. 4 is a flow chart of the operation of the system of FIG. 3.

Referring now to FIG. 4, a flow chart 90 of the steps of operation of a system incorporating the machine 10 is illustrated. The first step in the operation of the system is to determine the void volume, identified at 92. As discussed above, the void volume can be determined by measurement or by calculation. The second step in the operation of the system is to generate a signal based on the determined void volume, identified at 94. The third step in the operation of the system is to send the signal that is based on the determined void volume to the air cushion machine 10, identified at 96. Finally, the fourth and final step in the operation of the system is to command the air cushion machine 10 to produce a number of air cushions 34 having a total volume equal to the void volume, as indicated at 98.

Figure 5:
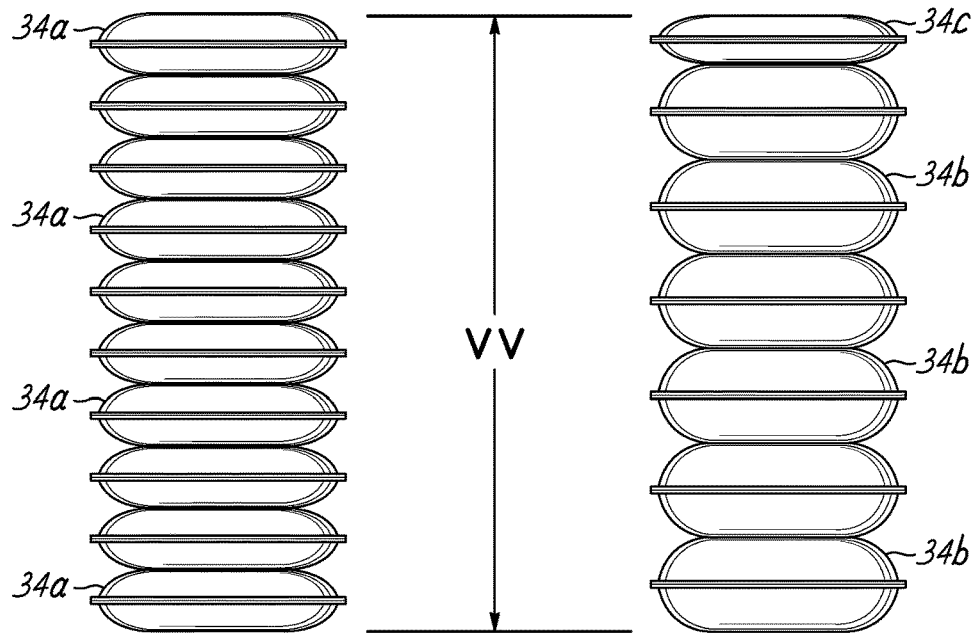
FIG. 5 is a side view of two strings of air cushions which can be produced by the machine and system of FIGS. 1-4.

Current air cushion machines inflate all of the air cushions produced on the machine to the same inflation value, e.g. 75% of the available volume of each individual air cushion. With the system of the present invention, the air cushion machine 10 can inflate the individual air cushions in a string of air cushions to 75%, greater than 75%, or less than 75%, such that the total air cushion volume in the string of air cushions is equal to the void volume. Referring to FIG. 5, VV diagrammatically illustrates the void volume to be filled with air cushions. VV can be achieved by the machine 10 producing a string of ten air cushions 34a each inflated to 50% of capacity, as one example. As another example, VV can be achieved by the machine 10 producing a string of six air cushions 34b each inflated to 80% of capacity and one air cushion 34c inflated to 20% of capacity. As yet another example, VV can be achieved by the machine 10 producing a string of air cushions each inflated to a different capacity, so long as the total volume of the air cushions in the string of air cushions is equal to VV. The system of the present invention has all of these capabilities, all of which are encompassed by the scope of the present invention.

An air cushion would likely have a minimum allowable inflation value such that it would function effectively as cushioning material, as well as a maximum allowable inflation value such that it would function effectively as cushioning material and so as not to risk bursting the cushion. With these two values as inputs, the controller/processor can determine the appropriate number of air cushions at a given acceptable inflation value to produce VV, and then control the inflation assembly by varying the air blower output pressure, control the pulling assembly, and control the sealing assembly, to produce the correct number of air cushions at the correct inflation. Alternatively, the controller/processor could control the inflation assembly to produce a constant air blower output pressure, control the pulling assembly by varying the speed of the film and thus the amount of time that the forming air cushions are exposed to the inflation assembly to thereby vary the inflation value, and control the sealing assembly, to produce the correct number of air cushions at the correct inflation. All such variations are embraced by scope of the present invention.

Figure 7:
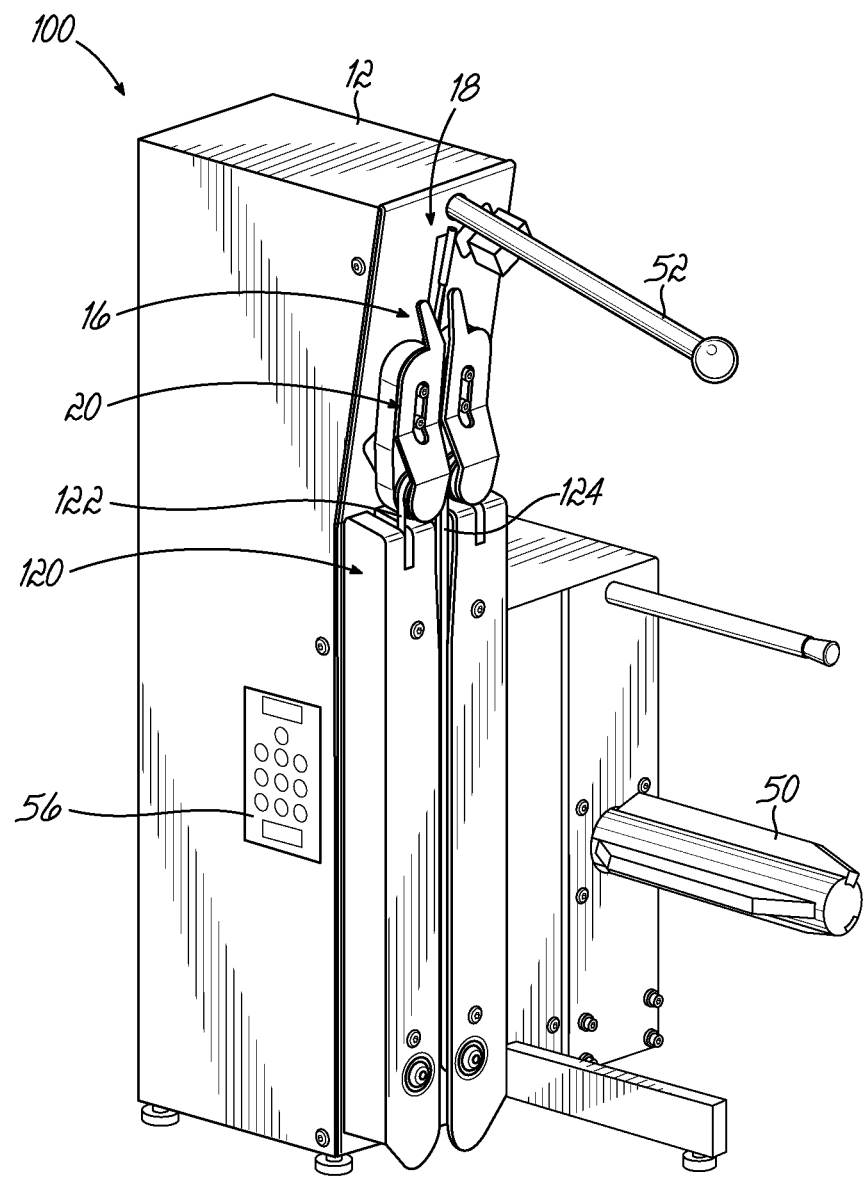
FIG. 7 is a perspective view of another air cushion machine which can be utilized in the practice of the present invention.

Referring now to FIG. 7, and with like numbers representing like elements, another machine 100 for producing air filled cushions for use as protective packaging cushioning material is illustrated. The machine 100 comprises a machine frame 12, a supply of plastic film (not shown), a pulling assembly 16 for pulling the plastic film through the machine 10, an air injection assembly 18 for injecting air between the plies of the plastic film, a longitudinal heat sealing assembly 20 for sealing the plies of plastic film together after air is injected between the plies of film, and a separation assembly 120 for separating a leading air cushion or string of air cushions from a trailing air cushion. The separation assembly 120 comprises an opposed pair of rotating belts 122, 124, operating at a speed greater than the belts 40, 42 of the pulling assembly 16, which are selectively engageable with the edge 38 of the film sheet 26 (which at this point in the machine 10 have been sealed back together, after being slit, as at 22) to "pop" a line of perforations 32.

Figure 8:
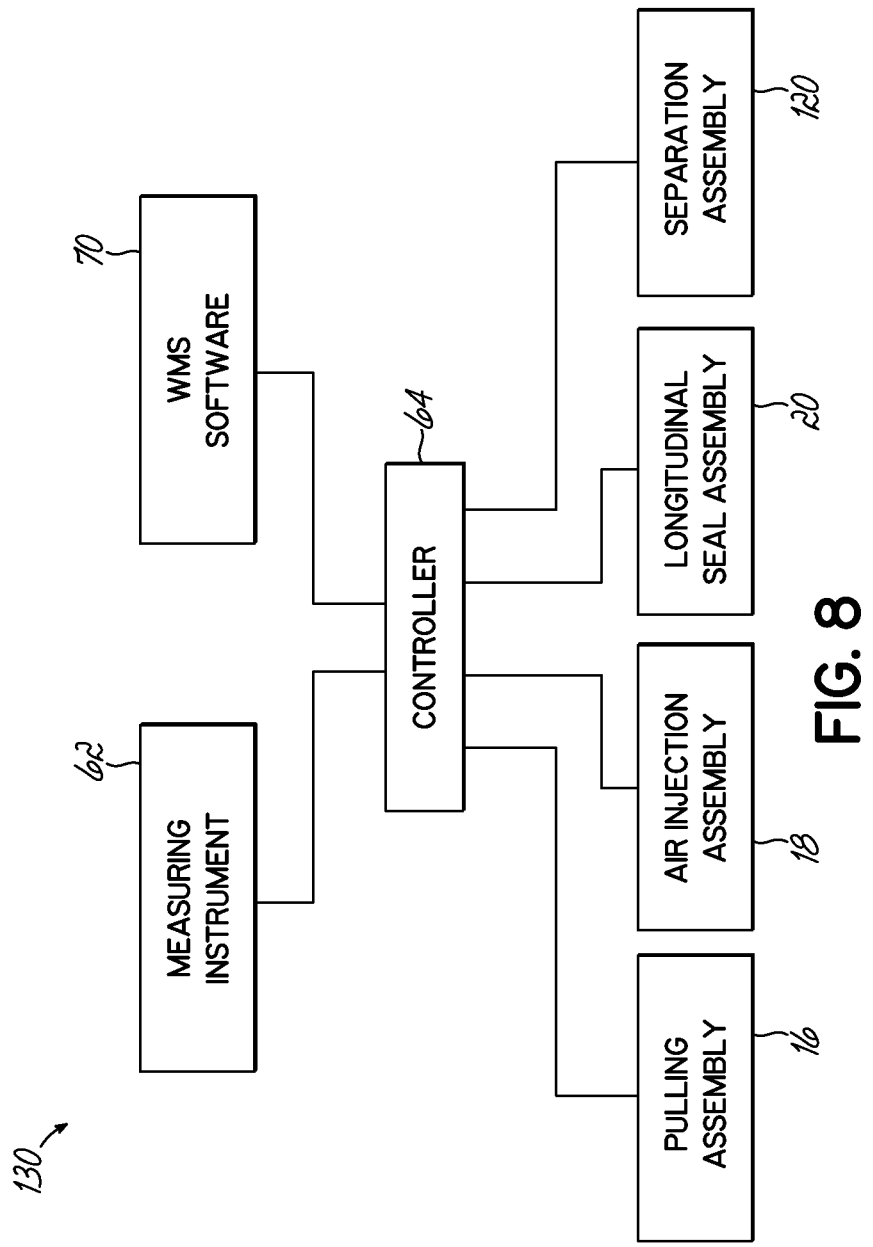
FIG. 8 is a block diagram of a system utilizing the air cushion machine of FIG. 7.

Referring now to FIG. 8, and again with like numbers representing like elements, a block diagram 130 of a system incorporating the machine 100 is illustrated. The block diagram 130 is similar to the block diagram 60 of FIG. 3, the difference being that the controller 64 also sends signals to the separation assembly 120 for controlling this assembly.

Note that other forms of film can be used in the practice of the present invention. For example, one type of film is an elongated sheet folded longitudinally in half along a longitudinal center line. Transverse heat seals and lines of perforations are then formed in the folded sheet. The sheet is then rolled into a supply roll. Thus, this type of film supply does not require slitting prior to air injection; the longitudinal sealing assembly seals the free edges of the folded sheet.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

What is claimed is:

1. A method of producing an interconnected string of air cushions from a supply of plastic film with an air cushion machine for cushioning at least one item to be shipped in a box, the machine configured to inflate each air cushion in the string of air cushions to a variable inflation value selected from a range of inflation values, the machine having an inflation assembly for injecting air between plies of the film, a pulling assembly for pulling the film through the machine, and a longitudinal sealing assembly for sealing the plies of the film, the method comprising the steps of:

determining a void volume defined by a difference between a volume of the box and a volume of the at least one item to be shipped in the box, determining a quantity of air cushions in the string of air cushions, each of a substantially identical length and width, to be produced and the variable inflation value for each air cushion in the quantity of air cushions such that a total air cushion volume of the quantity of air cushions in the string of air cushions produced is equal to the void volume, wherein each air cushion in the string of air cushions is prescribed with a unique inflation value that may vary from cushion to cushion within the string of air cushions, wherein each air cushion in the string of air cushions has a minimum allowable inflation value such that the air cushion will function effectively as cushioning material and a maximum allowable inflation value such that the air cushion will function effectively as cushioning material and not risk bursting, wherein the step of determining the inflation value for each air cushion in the string of air cushions provides a value within a range from the minimum allowable inflation value to the maximum allowable inflation value, and further wherein:

the inflation assembly is controlled to vary an output pressure of the inflation assembly, the pulling assembly is controlled, and the sealing assembly is controlled, to produce the determined quantity of air cushions in the string of air cushions and the inflation value for each, or the inflation assembly is controlled to produce a constant output pressure of the inflation assembly, the pulling assembly is controlled to vary the speed of the film and thus the amount of time that the forming air cushions are exposed to the inflation assembly to thereby vary the inflation value, and the sealing assembly is controlled, to produce the determined quantity of air cushions in the string of air cushions and the inflation value for each; and producing the determined quantity of air cushions in the string of air cushions with the air cushion machine, and then repeating the above steps for a subsequent item to be shipped in a subsequent box to determine a subsequent different quantity of air cushions in a subsequent interconnected string of air cushions having a subsequent different total air cushion volume equal to a subsequent different void volume, and producing the subsequently determined quantity of air cushions in the subsequent string of air cushions, without manual input from an operator.

2. The method of claim 1 wherein the void volume is measured with an instrument.

3. The method of claim 1 wherein the void volume is calculated based on a known volume of the at least one item and a known volume of the box.

4. The method of claim 1 wherein each air cushion of the quantity of air cushions has the same volume.

5. The method of claim 1 wherein all but one air cushion of the quantity of air cushions has the same volume.

6. The method of claim 1 further comprising the steps of:
generating a signal representative of the void volume,
supplying the signal to the air cushion machine, and
causing, with the signal, the air cushion machine to produce the quantity of air cushions having the total air cushion volume equal to the void volume.

7. A protective packaging system for producing material for cushioning at least one item to be shipped in a box, comprising:

means for determining a void volume defined by a difference between a volume of the box and a volume of the at least one item to be shipped in the box, and an air cushion machine for producing an interconnected string of air cushions from a supply of plastic film, the machine configured to inflate each air cushion to a variable inflation value selected from a range of inflation values, the machine having an inflation assembly for injecting air between plies of the film, a pulling assembly for pulling the film through the machine, and a longitudinal sealing assembly for sealing the plies of the film, the system configured to determine a quantity of air cushions in the string of air cushions, each of a substantially identical length and width, to be produced and the variable inflation value for each air cushion in the quantity of air cushions such that a total air cushion volume of the quantity of air cushions in the string of air cushions produced is equal to the void volume, wherein the air cushion machine is configured to prescribe each air cushion in the string of air cushions with a unique inflation value that may vary from cushion to cushion within the string of air cushions, the air cushion machine controllable in response to the void volume to produce the quantity of air cushions in the string of air cushions, wherein each air cushion in the string of air cushions has a minimum allowable inflation value such that the air cushion will function effectively as cushioning material and a maximum allowable inflation value such that the air cushion will function effectively as cushioning material and not risk bursting, wherein the inflation value for each air cushion in the string of air cushions is within a range from the minimum allowable inflation value to the maximum allowable inflation value, and further wherein:

the inflation assembly is controlled to vary an output pressure of the inflation assembly, the pulling assembly is controlled, and the sealing assembly is controlled, to produce the determined quantity of air cushions in the string of air cushions and the inflation value for each, or the inflation assembly is controlled to produce a constant output pressure of the inflation assembly, the pulling assembly is controlled to vary the speed of the film and thus the amount of time that the forming air cushions are exposed to the inflation assembly to thereby vary the inflation value, and the sealing assembly is controlled, to produce the determined quantity of air cushions in the string of air cushions and the inflation value for each, the system further configured to determine a subsequent different quantity of air cushions in a subsequent interconnected string of air cushions having a subsequent different total air cushion volume equal to a subsequent different void volume for a subsequent item to be shipped in a subsequent box, without manual input from an operator.

8. The protective packaging system of claim 7 further comprising a controller for receiving a signal, representative of the void volume, from the means for determining a void volume, and for sending a signal to the air cushion machine commanding the air cushion machine to produce the quantity of air cushions having the total air cushion volume.

9. The protective packaging system of claim 7 wherein the means for determining the void volume is an instrument of measurement.

10. The protective packaging system of claim 7 wherein the means for determining the void volume is a database of box volumes and item volumes and a processor for subtracting item volumes from box volumes.

11. The protective packaging system of claim 7 wherein the air cushion machine further includes a controller, and wherein the controller sends signals to the pulling assembly, the inflation assembly, and the sealing assembly in commanding the air cushion machine to produce the quantity of air cushions having the total air cushion volume.

12. The protective packaging system of claim 11 wherein the supply of plastic film comprises an elongated continuous tubular sheet having a series of transverse heat seals formed in the plastic sheet and spaced apart along the longitudinal extent of the sheet, and a series of transverse lines of perforations spaced apart along the longitudinal extent of the sheet.

13. The protective packaging system of claim 7 wherein the air cushion machine further includes a separation assembly for separating a leading air cushion or string of air cushions from a trailing air cushion, and wherein the controller sends signals to the separation assembly to command the separation assembly to separate the leading air cushion or string of air cushions from the trailing air cushion.

\* \* \* \* \*